US006596211B2

(12) United States Patent
Kawamura et al.

(10) Patent No.: US 6,596,211 B2
(45) Date of Patent: Jul. 22, 2003

(54) MOLDING AND TENTATIVELY RETAINING MOLD AND METHOD OF MOLDING AND TENTATIVE RETENTION

(75) Inventors: Norio Kawamura, Shizuoka (JP); Hiroshi Murashita, Shizuoka (JP); Junich Hamamoto, Shizuoka (JP); Takashi Masuda, Shizuoka (JP); Toshimi Nakashima, Shizuoka (JP); Kazuhiko Hiraguchi, Shizuoka (JP); Kenji Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 78 days.

(21) Appl. No.: 09/739,652

(22) Filed: Dec. 20, 2000

(65) Prior Publication Data

US 2001/0015511 A1 Aug. 23, 2001

(30) Foreign Application Priority Data

Dec. 20, 1999 (JP) ...................................... P. 11-361280

(51) Int. Cl.[7] .......................... B29C 45/38; B29C 65/56

(52) U.S. Cl. .................... 264/161; 264/238; 264/328.8; 425/556; 425/577

(58) Field of Search ................................ 264/161, 238, 264/297.2, 328.1, 328.8, 328.11, 334; 425/438, 517, 556, 577

(56) References Cited

U.S. PATENT DOCUMENTS

| | | | | |
|---|---|---|---|---|
| 3,013,308 A | * | 12/1961 | Armour | 264/238 |
| 4,012,827 A | * | 3/1977 | Abrams | 249/68 |
| 5,200,132 A | * | 4/1993 | Shfaram et al. | 264/238 |
| 5,709,831 A | * | 1/1998 | Endo et al. | 264/238 |
| 5,911,935 A | | 6/1999 | Kawase | 264/238 |
| 6,206,681 B1 | * | 3/2001 | Kawase et al. | 264/238 |
| 6,234,782 B1 | * | 5/2001 | Hansen | 264/238 |

FOREIGN PATENT DOCUMENTS

| | | | | |
|---|---|---|---|---|
| EP | 0 732 780 A2 | | 9/1996 | |
| JP | 57-135133 | * | 8/1982 | 264/238 |
| JP | 8-250183 | | 9/1996 | |

OTHER PUBLICATIONS

Rosato et al., Injection Molding Handbook, second edition, 1995, International Thomson Publishing, pp. 257–260.*

* cited by examiner

*Primary Examiner*—Jill L. Heitbrink
(74) *Attorney, Agent, or Firm*—Sughrue Mion, PLLC

(57) ABSTRACT

A molding and tentatively retaining mold 10 of the invention has a plurality of molds which are relatively movable with respect to a fixed mold, and molds a housing 31 and rear holders 32 and 33, which are respectively independent, in a plurality of cavities formed in cooperation with the fixed mold. When rear holders 32 and 33 after molding are relatively moved with respect to a housing 31 by movable molds 12 and 15 and are tentatively retained, a runner 20 for a cavity for molding the housing 31 is kept connected to the housing 31 through a tunnel gate 20*a*. In addition, a portion 15*a* of the fourth movable mold 15 for forming the cavity in the housing 31 is kept fitted to the housing 31 as it was during molding.

4 Claims, 11 Drawing Sheets

MOLDING AND TENTATIVELY RETAINING MOLD AND METHOD OF MOLDING AND TENTATIVE RETENTION

BACKGROUND OF THE INVENTION

1. Field of the Invention

The present invention relates to a molding and tentatively retaining mold and a method of molding and tentative retention in which a plurality of kinds of independent parts of different shapes are molded in a plurality of cavities formed between a fixed mold and a plurality of movable molds, and at least one part after molding is relatively moved with respect to another part by the movable mold so as to set the parts in a tentatively retained state.

The present application is based on Japanese Patent Application No. Hei. 11-361280, which is incorporated herein by reference.

2. Description of the Related Art

Referring to FIG. 11, as a conventional molding and tentatively retaining mold 100 for effecting the molding and tentative retention of a connector 110 with rear holders in its interior, JP-A-8-250183 discloses one which is comprised of an unillustrated fixed mold, a first movable mold 101 which is movable in vertical directions in FIG. 11, a pair of second movable molds 102 which are movable in left- and rightward directions in FIG. 11, and a pair of third movable molds 103 which are movable in directions substantially perpendicular to the second movable molds 102.

It should be noted that the connector 110 with rear holders is comprised of a housing 111 having a plurality of terminal accommodating chambers 113 and a pair of rear holders 112 which are respectively retained on both sides of the housing Inner surfaces of the first and second movable molds 101 and 102 respectively form a cavity for molding the housing 111 of the connector 110 with rear holders in cooperation with the fixed mold. In addition, outer surfaces of the first movable mold 101, inner surfaces of the second movable molds 102, and inner surfaces of the third movable molds 103 respectively form cavities for molding the respective rear holders 112 of the connector 110 with rear holders in cooperation with the fixed mold.

In the above-described molding and tentatively retaining mold 100, when the molding and tentative retention of the connector 110 with rear holders is effected, a resin material is charged into the respective cavities, for instance, from the upper direction in FIG. 11 through unillustrated runners for the respective cavities in a state in which the fixed mold and the movable molds 101, 102, and 103 are joined together.

Namely, as shown in FIG. 12, the charging of the resin material into the cavities by using the runners is effected through a pinpoint gate 114 in order to avoid the various mechanical parts inside the molds.

Consequently, the housing 111 and the rear holders 112 of the connector 110 with rear holders are independently molded, respectively.

Next, the first movable mold 101 is moved upwardly in FIG. 11, and the second movable molds 102 are respectively moved in the directions of arrows in FIG. 11. Consequently, predetermined gaps are respectively produced between the respective rear holders 112 and the housing 111. In this state, the third movable molds 103 are respectively moved toward the housing 111 so as to tentatively retain the rear holders 112 onto the side surfaces of the housing 111, respectively.

After the housing 111 and the rear holders 112 are tentatively retained, the third movable molds 103 are respectively returned to their original positions. Then, the connector 110 with rear holders in the tentatively retained state is removed from the mold.

With the above-described conventional molding and tentatively retaining mold 100, there has been a problem in that when the rear holders 112 are tentatively retained onto the housing 111 after the molding of the housing 111 and the rear holders 112, trouble occurs in tentative retention owing to the shakiness or the like of the housing 111. Accordingly, some means or other has been required for holding the housing 111 after molding.

SUMMARY OF THE INVENTION

The object of the invention is to provide a molding and tentatively retaining mold and a method of molding and tentative retention which make it possible to reliably prevent the shakiness or the like of another part during tentative retention without especially requiring the means for holding the other part after molding, thereby making it possible to reliably effect the tentative retention of the parts.

The above object of the invention can be attained by the following arrangements.

(1) A molding and tentatively retaining mold comprising:
- a fixed mold;
- a plurality of movable molds provided in such a manner as to be relatively movable with respect to said fixed mold and adapted to respectively mold a plurality of kinds of independent parts of different shapes in a plurality of cavities formed in cooperation with said fixed mold, and to relatively move at least one part with respect to another part after molding to thereby set said parts in a tentatively retained state; and
- a plurality of runners respectively provided for the cavities to charge a molding material into the cavities;
- wherein, when at least one of said parts after molding is relatively moved with respect to said other part by said movable molds and is tentatively retained, a runner for a cavity for molding said other part remains connected to said other part through a tunnel gate, and
- the connection between said other part and said tunnel gate is cut off when said parts are removed from said mold after the tentative retention of said parts.

(2) A molding and tentatively retaining mold comprising:
- a fixed mold;
- a plurality of movable molds provided in such a manner as to be relatively movable with respect to said fixed mold and adapted to respectively mold a plurality of kinds of independent parts of different shapes in a plurality of cavities formed in cooperation with said fixed mold, and to relatively move at least one part with respect to another part after molding to thereby set said parts in a tentatively retained state; and
- a plurality of runners respectively provided for the cavities to charge a molding material into the cavities;
- wherein, when at least one of said parts after molding is relatively moved with respect to said other part by said movable molds and is tentatively retained, at least one of said movable molds for forming a cavity for molding said other part remains fitted to said other part as it was during molding.

(3) A method of molding and tentatively retaining, comprising the steps of:
- forming a plurality of cavities between a fixed mold and a plurality of movable molds provided in such a manner as to be relatively movable with respect to said fixed mold;

charging a molding material into said cavities through runners respectively provided for said cavities;

molding a plurality of kinds of independent parts of different shapes in said cavities;

moving relatively at least one of said movable molds with respect to said another movable mold to thereby tentatively retain at least one of said parts to said other part, keeping at least one of said runners for a cavity for molding said other part connected to said other part through a tunnel gate, and removing said parts from said mold to cut off the connection between said other part and said tunnel gate.

(4) A method of molding and tentatively retaining, comprising the steps of:

forming a plurality of cavities between a fixed mold and a plurality of movable molds provided in such a manner as to be relatively movable with respect to said fixed mold;

charging a molding material into said cavities through runners respectively provided for said cavities;

molding a plurality of kinds of independent parts of different shapes in said of cavities; and moving relatively at least one of said movable molds with respect to said another movable mold to thereby tentatively retain at least one of said parts to said other part, while remaining at least one of said movable molds for molding said other part fitted to said other part as it was during molding.

In the molding and tentatively retaining mold constructed in (1) above in accordance with the invention, a molding material is charged into a plurality of cavities formed between the fixed mold and the movable molds through runners. Consequently, a plurality of kinds of independent parts of different shapes are respectively molded in the cavities.

After the molding of the respective parts, the movable mold relatively moves at least one part with respect to another part, thereby setting the parts in a tentatively retained state.

At this juncture, the runner for the cavity for molding the other part remains connected to the other part through the tunnel gate. Consequently, the shakiness and the like of the other part during tentative retention can be prevented. The connection between the other part and the tunnel gate is cut off as the parts are removed from the mold after the tentative retention of the parts.

In the molding and tentatively retaining mold constructed in (2) above in accordance with the invention, a molding material is charged into a plurality of cavities formed between the fixed mold and the movable molds through runners. Consequently, a plurality of kinds of independent parts of different shapes are respectively molded in the cavities.

After the molding of the respective parts, the movable mold relatively moves at least one part with respect to another part, thereby setting the parts in a tentatively retained state.

At this juncture, at least one of the movable molds for forming the cavity for molding the other part remains fitted to the other part as it was during molding. Consequently, the shakiness and the like of the other part during tentative retention can be prevented.

In the method of molding and tentative retention arranged in (3) above in accordance with the invention, a molding material is charged into a plurality of cavities formed between a fixed mold and a plurality of movable molds provided in such a manner as to be relatively movable with respect to the fixed mold, through runners respectively provided for the cavities. Consequently, a plurality of kinds of independent parts of different shapes are respectively molded in the cavities.

Next, at least one part after molding is relatively moved with respect to another part, thereby setting the parts in a tentatively retained state.

At this juncture, the runner for the cavity for molding the other part is kept connected to the other part through the tunnel gate. Consequently, the shakiness and the like of the other part during tentative retention is prevented. The connection between the other part and the tunnel gate is cut off as the parts are removed from the mold after the tentative retention of the parts.

In the method of molding and tentative retention arranged in (4) above in accordance with the invention, a molding material is charged into a plurality of cavities formed between a fixed mold and a plurality of movable molds provided in such a manner as to be relatively movable with respect to the fixed mold, through runners respectively provided for the cavities. Consequently, a plurality of kinds of independent parts of different shapes are respectively molded in the cavities.

Next, at least one part after molding is relatively moved with respect to another part, thereby setting the parts in a tentatively retained state.

At this juncture, at least one of the movable molds for forming the cavity for molding the other part is kept fitted to the other part as it was during molding. Consequently, the shakiness and the like of the other part during tentative retention is prevented.

DETAILED DESCRIPTION OF THE PREFERRED EMBODIMENTS

Figure 1:
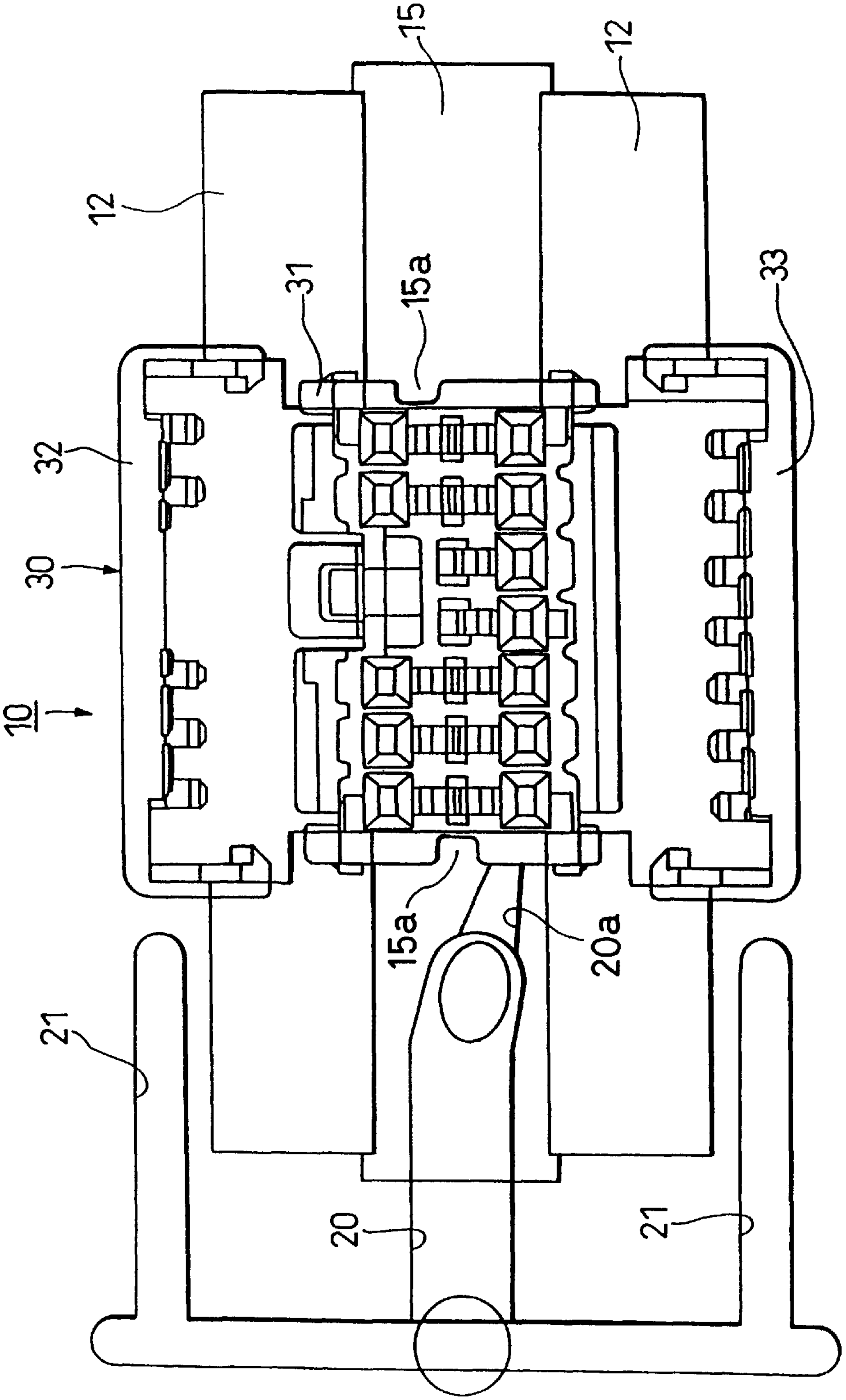
FIG. 1 is a schematic plan view illustrating runners for cavities of a molding and tentatively retaining mold and a connector with rear holders in accordance with an embodiment of the invention.

Referring now to the drawings, a description will be given of an embodiment of the invention.

Figure 2:
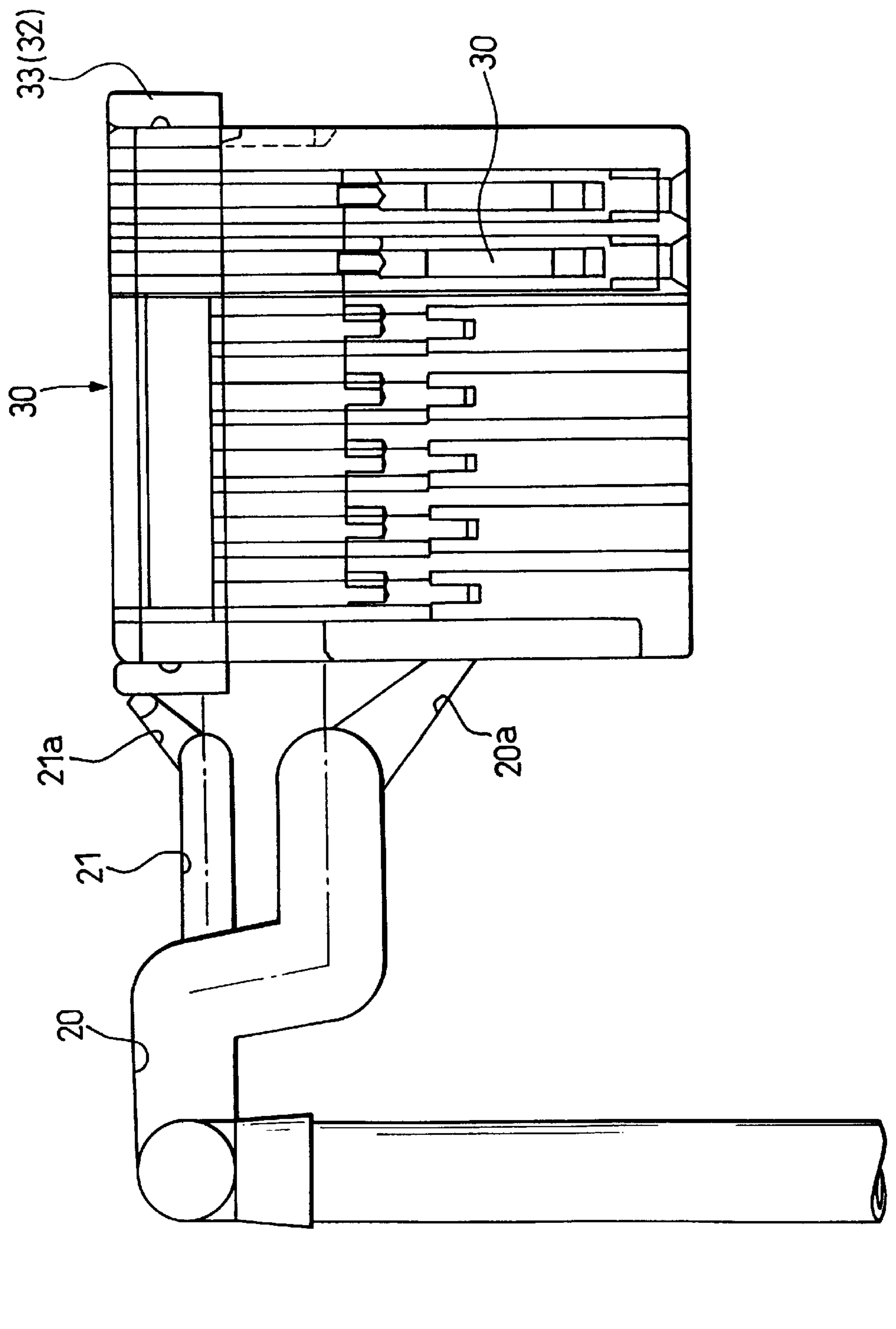
FIG. 2 is a schematic cross-sectional view of FIG. 1.
Figure 3:
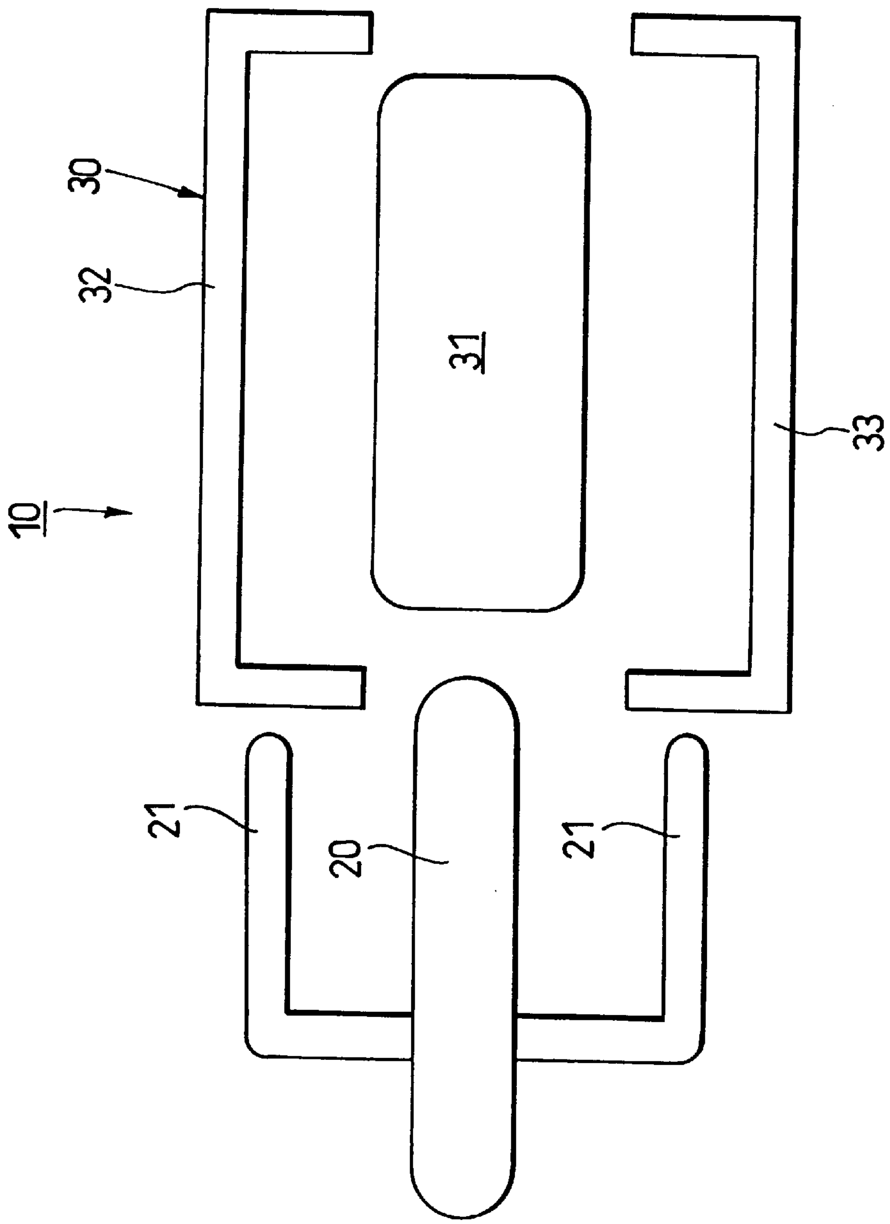
FIG. 3 is a plan view schematically representing FIG. 1.

FIG. 1 is a schematic plan view illustrating runners for cavities and a connector with rear holders of a molding and tentatively retaining mold in accordance with an embodiment of the invention. FIG. 2 is a schematic cross-sectional view of FIG. 1, and FIG. 3 is a plan view schematically illustrating FIG. 1.

Figure 4:
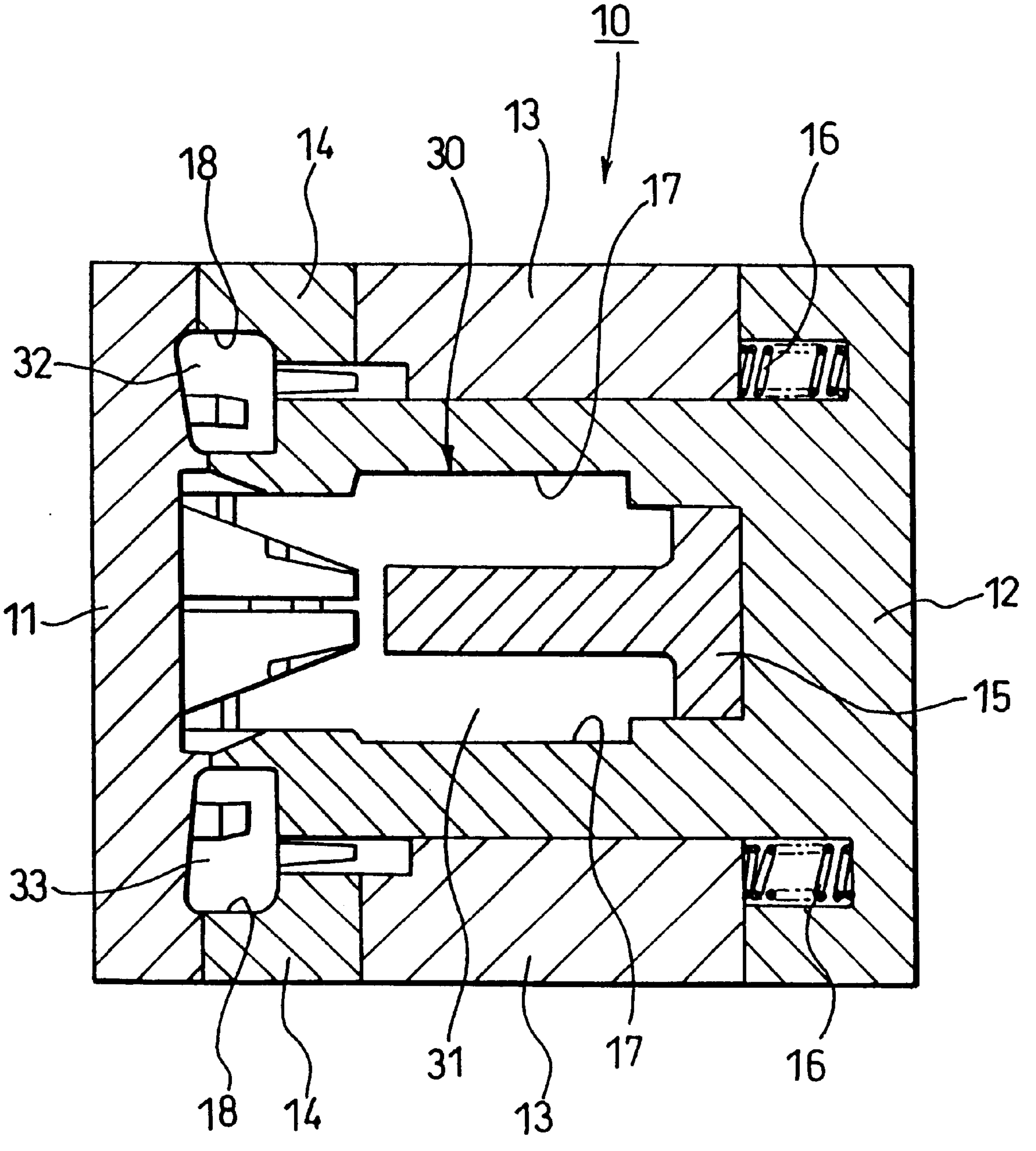
FIG. 4 is a schematic cross-sectional view illustrating a state during molding by the molding and tentatively retaining mold.
Figure 5:
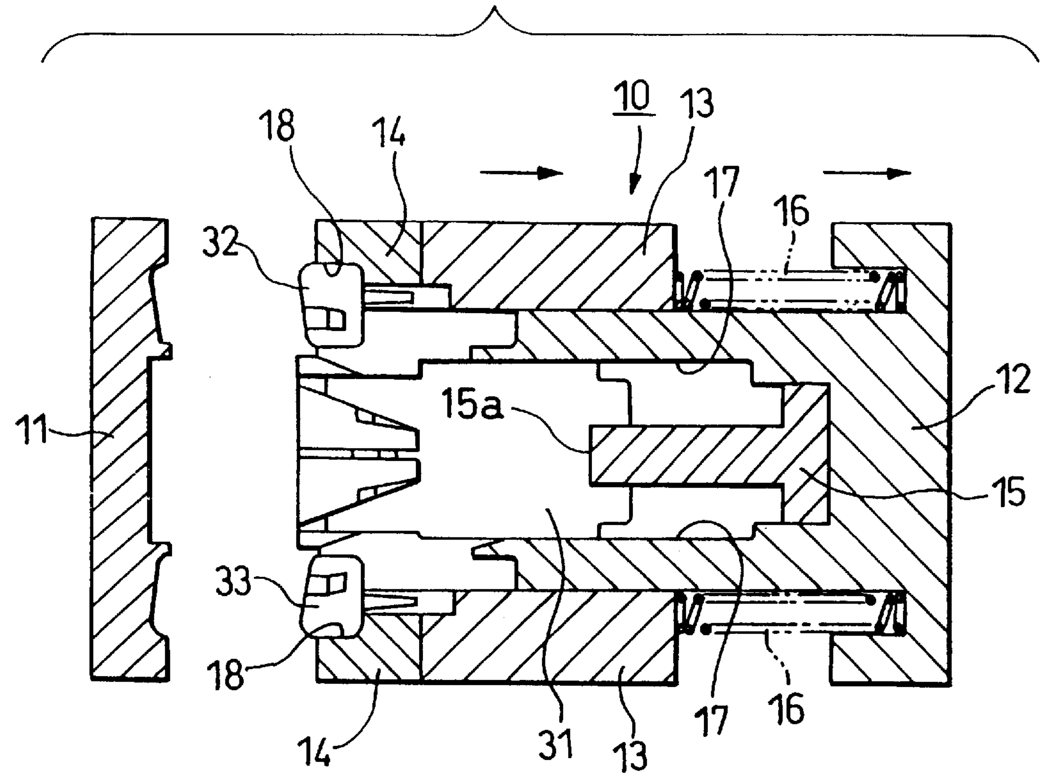
FIG. 5 is a schematic cross-sectional view illustrating a state prior to tentative retention after molding by the molding and tentatively retaining mold.
Figure 6:
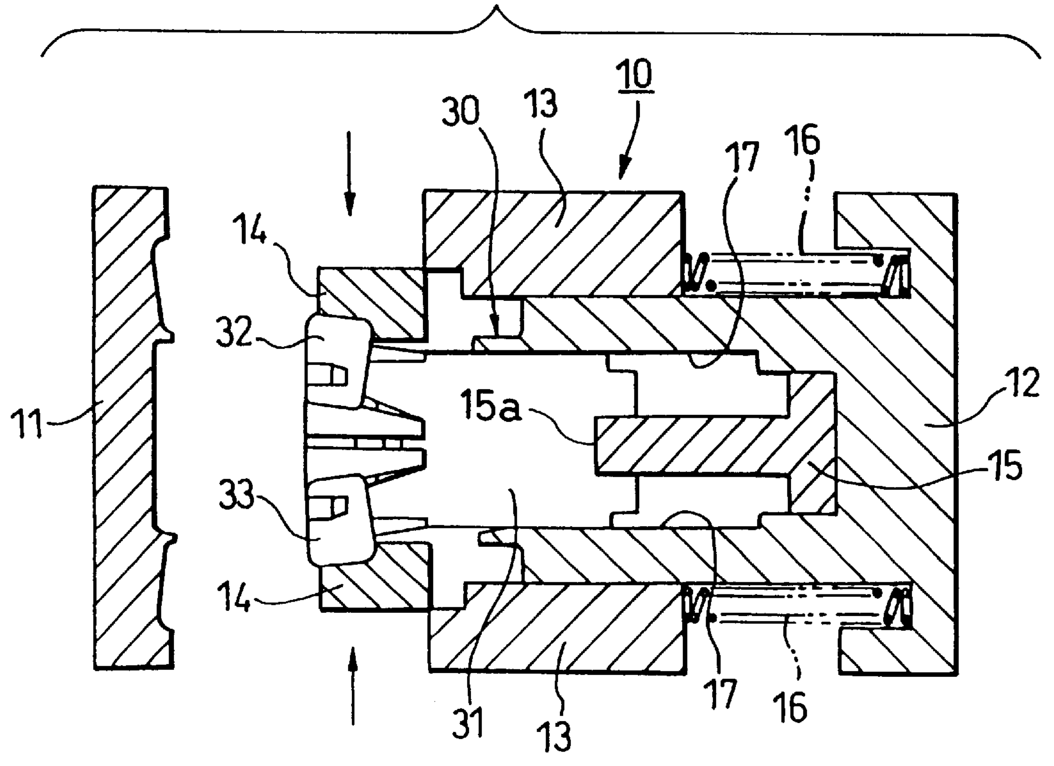
FIG. 6 is a schematic cross-sectional view illustrating a state during tentative retention by the molding and tentatively retaining mold.
Figure 7:
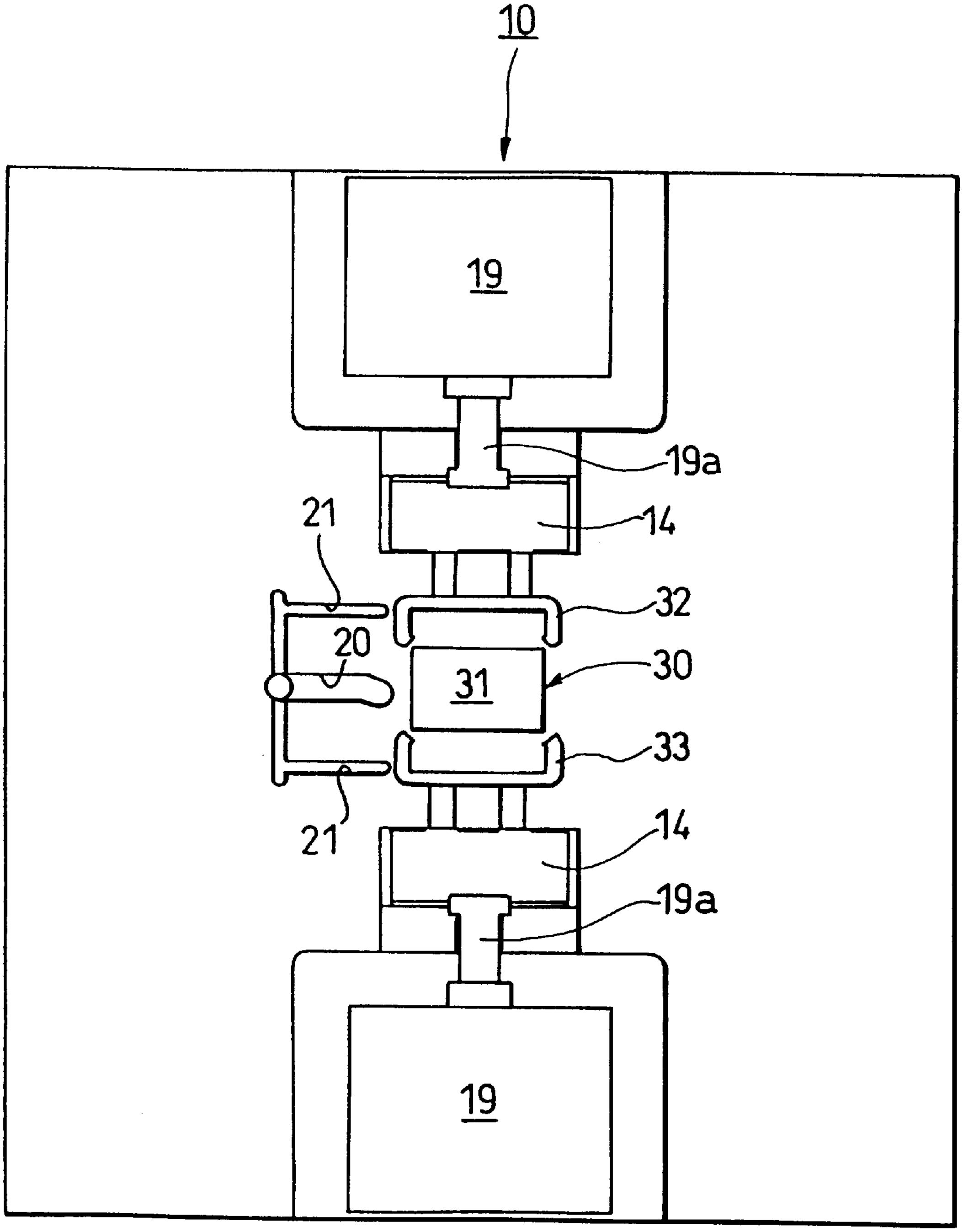
FIG. 7 is a schematic plan view illustrating a state prior to tentative retention by a pair of rear-holder tentatively retaining cylinders of the molding and tentatively retaining mold.
Figure 8:
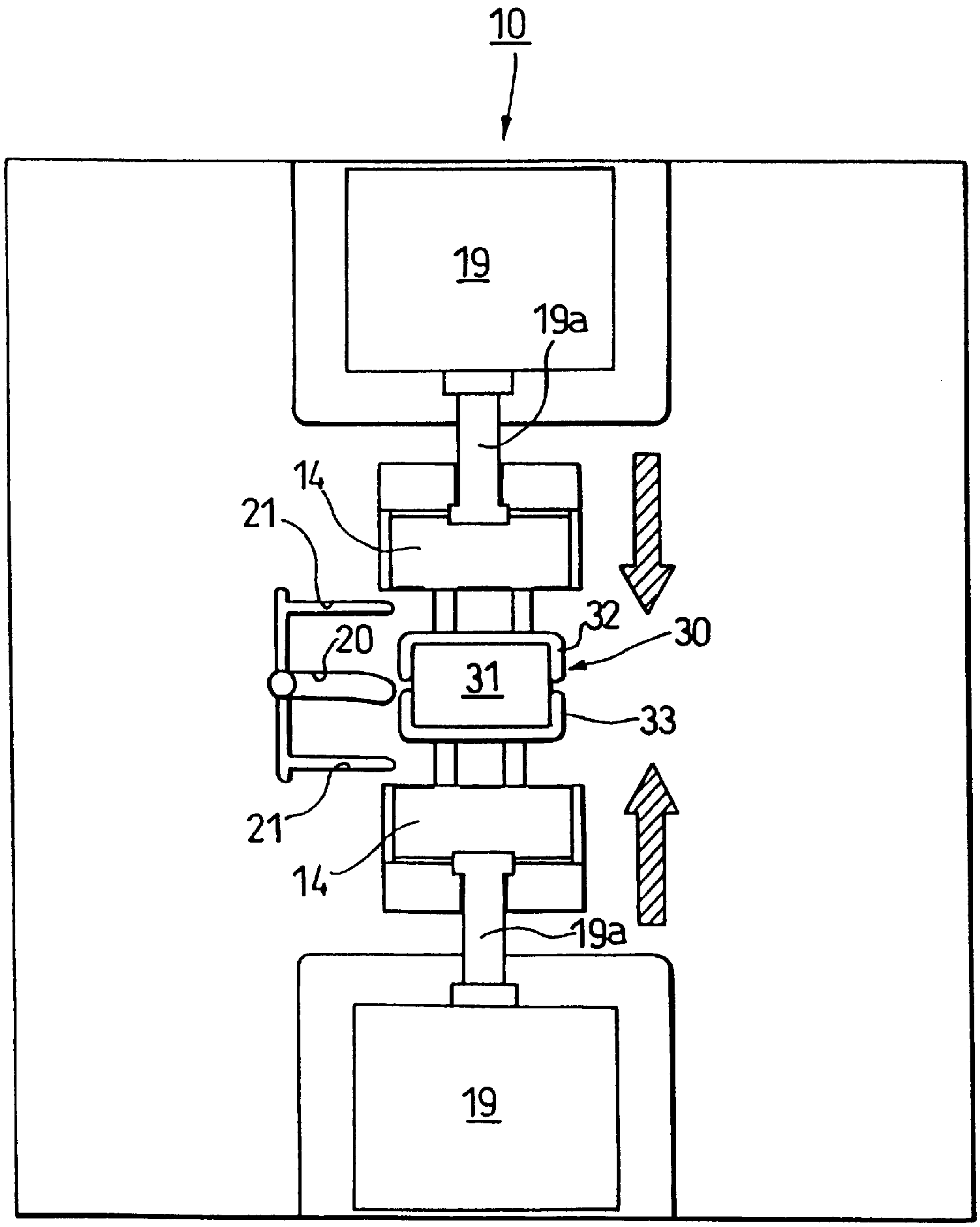
FIG. 8 is a schematic plan view illustrating a state after the tentative retention by the rear-holder tentatively retaining cylinders of the molding and tentatively retaining mold.

In addition, FIG. 4 is a schematic cross-sectional view illustrating a state during molding by the molding and tentatively retaining mold. FIG. 5 is a schematic cross-sectional view illustrating a state prior to tentative retention after molding by the molding and tentatively retaining mold. FIG. 6 is a schematic cross-sectional view illustrating a state during tentative retention by the molding and tentatively retaining mold. FIG. 7 is a schematic plan view illustrating a state prior to tentative retention by a pair of rear-holder tentatively retaining cylinders of the molding and tentatively retaining mold. FIG. 8 is a schematic plan view illustrating a state after the tentative retention by the rear-holder tentatively retaining cylinders of the molding and tentatively retaining mold.

Figure 9:
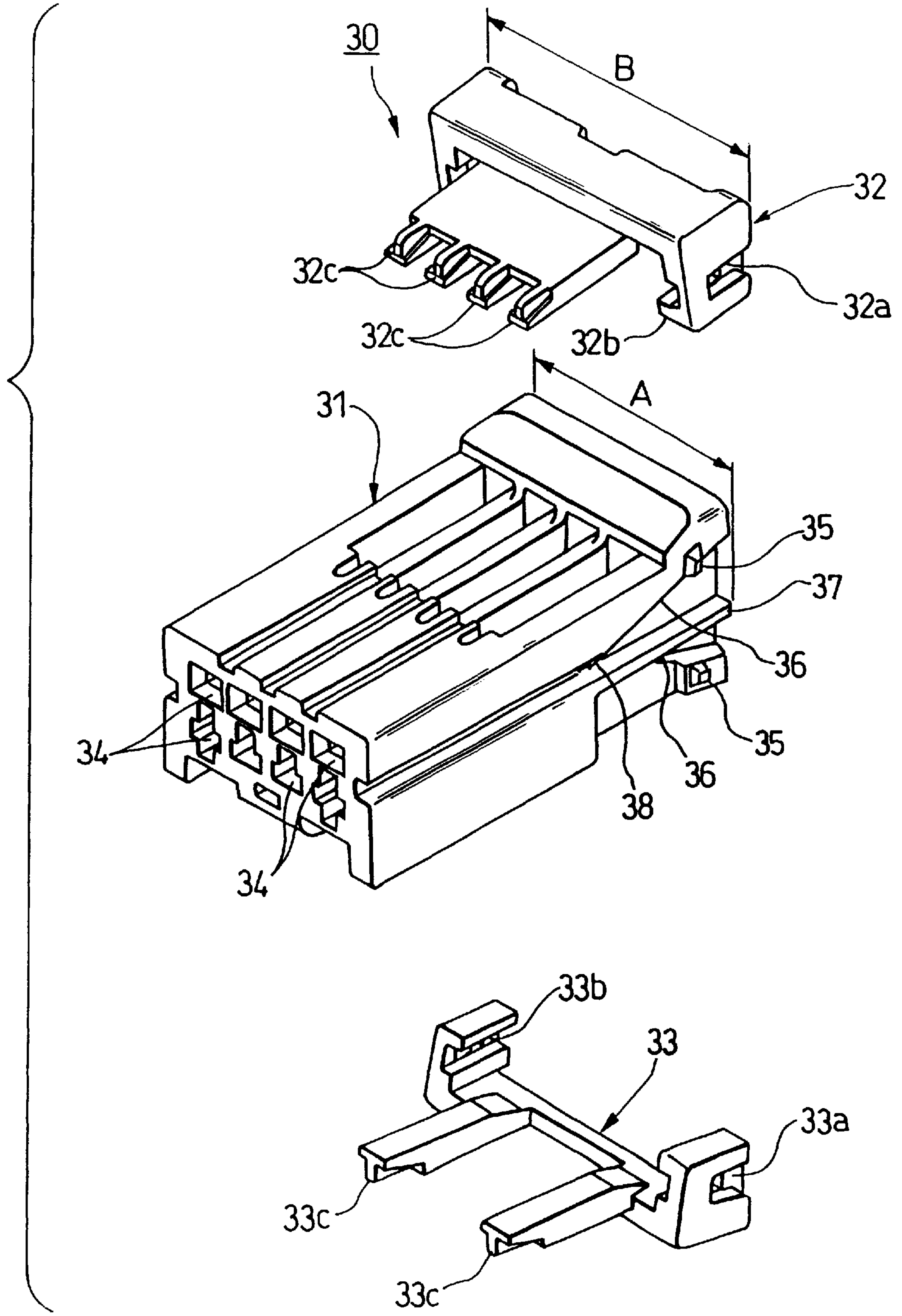
FIG. 9 is an exploded perspective view illustrating a connector with rear holders.
Figure 10:
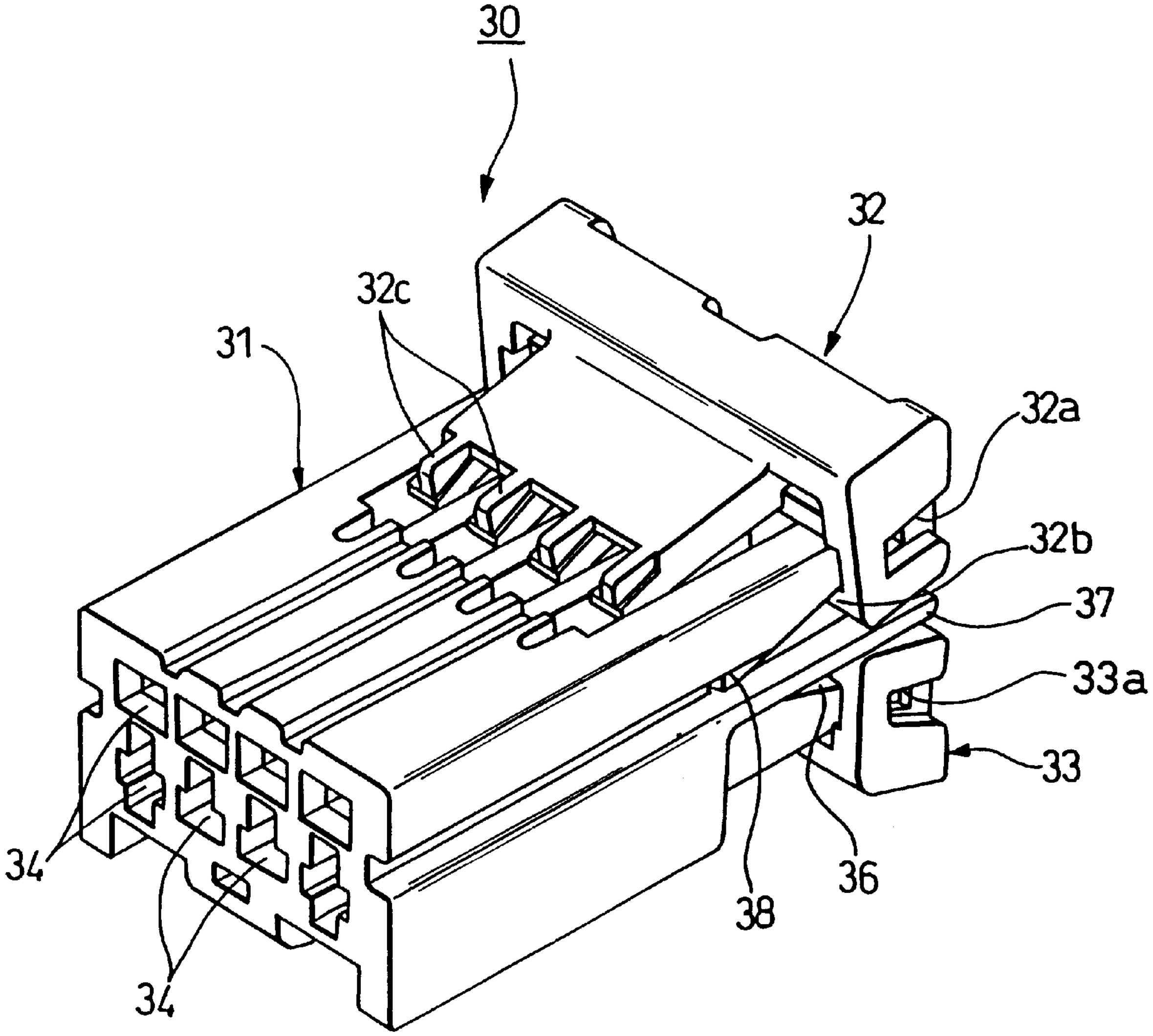
FIG. 10 is a perspective view illustrating a state of tentative retention of the connector with rear holders in FIG. 9.
Figure 11:
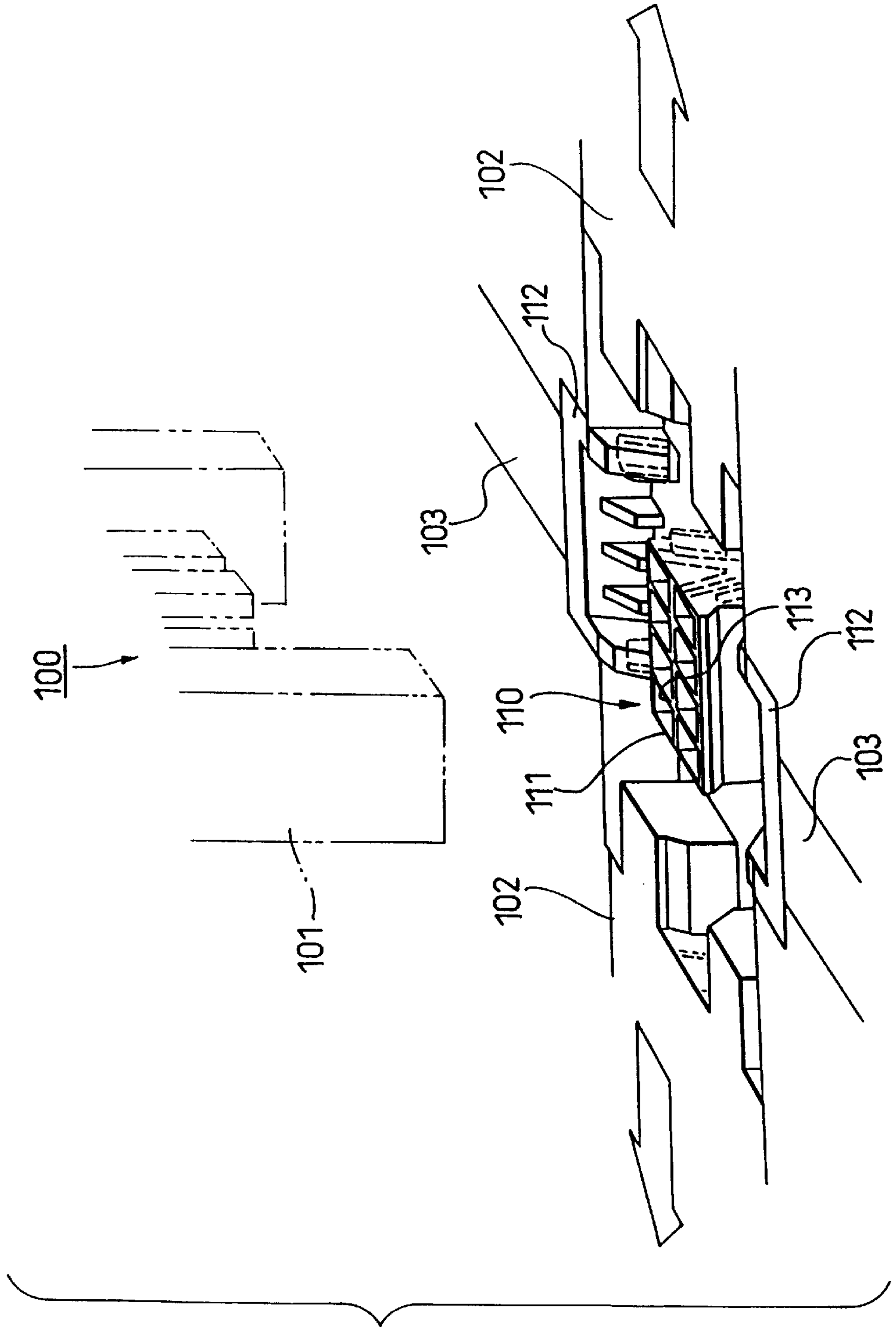
FIG. 11 PRIOR ART
FIG. 11 is a schematic perspective view illustrating a conventional molding and tentatively retaining mold.
Figure 12:
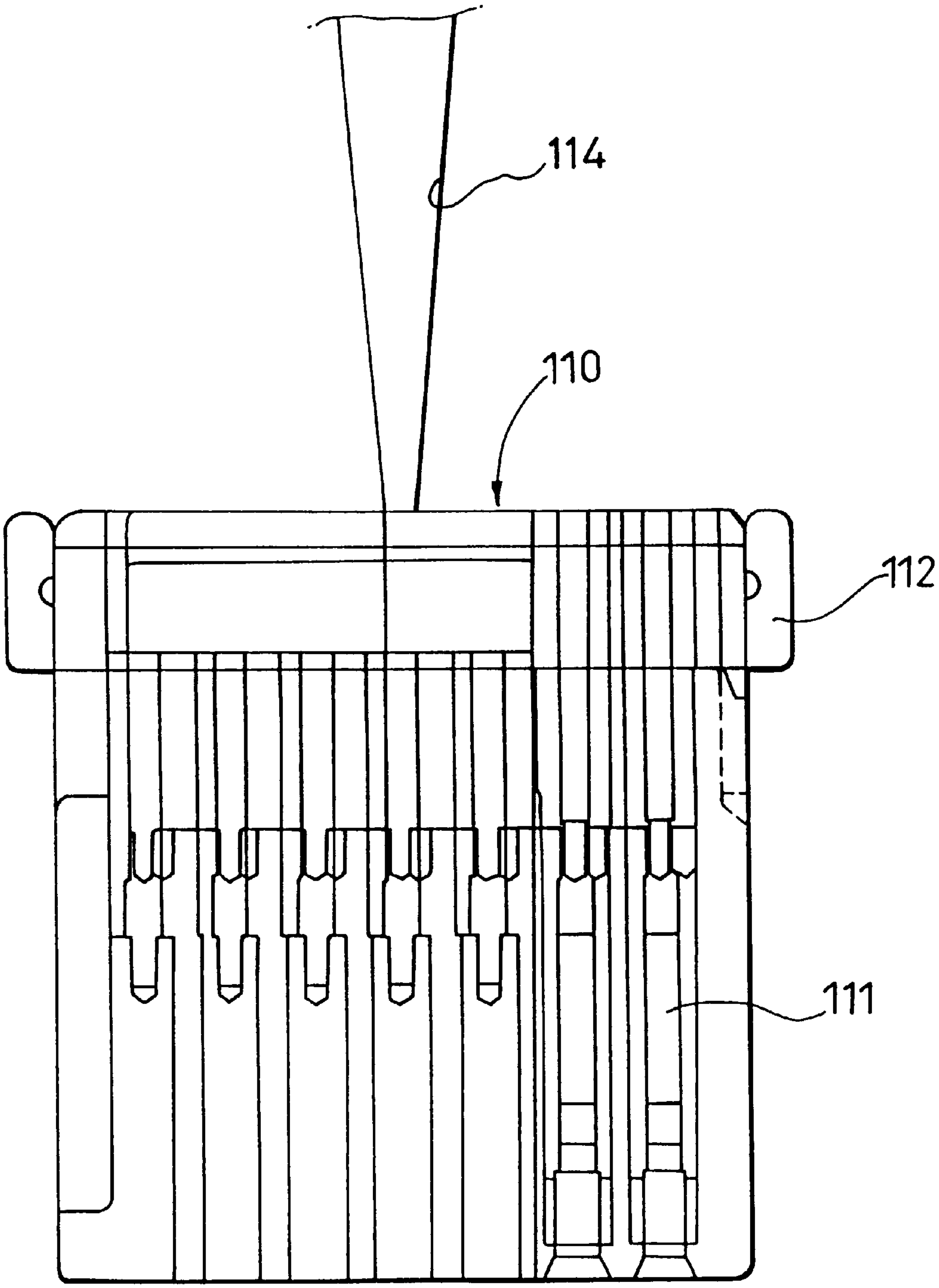
FIG. 12 PRIOR ART
FIG. 12 is a schematic cross-sectional view illustrating a pinpoint gate of the molding and tentatively retaining mold and the connector with rear holders shown in FIG. 11.

Further, FIG. 9 is an exploded perspective view illustrating a connector with rear holders. FIG. 10 is a perspective view illustrating a state of tentative retention of the connector with rear holders in FIG. 9.

Referring to FIGS. 1 to 8, a molding and tentatively retaining mold 10 is comprised of a fixed mold 11 and first to fourth movable molds 12, 13, 14, and 15, and compression springs 16 are interposed between the first movable mold 12 and the second movable molds 13, respectively. These compression springs 16 constantly urge the first and second movable molds 12 and 13 in directions in which they move away from each other (in the left- and rightward directions in FIG. 4).

The movable molds 12, 13, 14, and 15 are respectively provided in such a manner as to be relatively movable with respect to the fixed mold 11, and mold a housing 31 and rear holders 32 and 33 of a connector 30 with rear holders respectively independently within a plurality of cavities 17 and 18 formed in cooperation with the fixed mold 11. As the rear holders 32 and 33 after molding are relatively moved with respect to the housing 31, the housing 31 and the rear holders 32 and 33 are set in a tentatively retained state.

Inner surfaces of the first movable mold 12 and outer surfaces of the fourth movable mold 15 respectively form the cavity 17 for molding the housing 31 of the connector 30 with rear holders 30 in cooperation with inner surfaces of the fixed mold 11. Further, outer surfaces of the first movable mold 12 and inner surfaces of the third movable molds 14 respectively form the cavities 18 for molding the rear holders 32 and 33 of the connector 30 with rear holders in cooperation with the fixed mold 11.

The second movable molds 13 support the first movable mold 12 movably along the left- and rightward directions in FIG. 4, and support the third movable molds 14 movably along the vertical direction in FIG. 4.

As a pair of cylinder rods 19*a* of a pair of rear-holder tentatively retaining cylinders 19 (see FIGS. 7 and 8) project, the third movable molds 14 are moved toward the housing 31 side along the vertical directions in FIG. 4 so as to tentatively retain the rear holders 32 and 33 onto the housing 31.

The fourth movable mold 15 is supported by the first movable mold 12, is movable in the left- and rightward directions in FIG. 4 in interlocking relation to the first movable mold 12, and holds the housing 31 during the tentative retention of the rear holders 32 and 33. Namely, when the rear holders 32 and 33 after molding are relatively moved with respect to the housing 31 by the third movable molds 14 and are tentatively retained, the fourth movable mold 15 moves in the rightward direction in FIG. 5 in interlocking relation to the movement of the first movable mold 12 in the same direction. At this juncture, a portion 15*a* of the fourth movable mold 15 for molding the cavity of the housing 31 is held as fitted to the housing 31 (in the state shown in FIGS. 5 and 6).

The fixed mold 11 and the movable molds 12, 13, 14, and 15 are provided with runners 20 and 21 serving as channels for the resin material to be charged for the respective cavities 17 and 18.

The runners 20 and 21 have diameters which are set for the respective cavities 17 and 18 so as to obtain a molding balance in the cavities 17 and 18, respectively. Namely, the ratio of the diameter between the runners 20 and 21 is set to a value whereby the charging of the resin material into the cavities 17 and 18 is completed substantially at the same time. For example, the diameter of the runner 20 for the cavity 17 in the housing 31 is set to about 4-fold in an area ratio with respect to the diameter of the runner 21 for the cavity 18 in each of the rear holders 32 and 33.

When the rear holders 32 and 33 after molding are relatively moved with respect to the housing 31 by the movable molds 12, 13, 14, and 15 and are tentatively retained, the runner 20 for the cavity 17 in the housing 31 remains connected to the housing 31 through a tunnel gate 20*a*. The connection between the housing 31 and the tunnel gate 20*a* is cut off when the connector 30 with rear holders is removed from the mold after the tentative retention of the housing 31 and the rear holders 32 and 33.

Further, the runners 21 for the cavities 18 in the respective rear holders 32 and 33 are respectively located at parting lines between the fixed mold 11 and the movable molds 12, 13, 14, and 15. During molding, the runners 21 are connected to the rear holders 32 and 33 through tunnel gates 21*a*, respectively, and the connection is cut off in conjunction with the relative movement of the movable molds 12, 13, and 14 with respect to the fixed mold 11.

Next, referring to FIGS. 9 and 10, a detailed description will be given of the connector 30 with rear holders.

Namely, the connector 30 with rear holders includes the housing 31 having a plurality of terminal accommodating chambers 34, as well as the pair of rear holders 32 and 33 which are retained on the upper and lower side surfaces, as viewed in FIG. 1, of the housing 31. Connecting terminals (not shown) attached to wires or the like are respectively inserted into the terminal accommodating chambers 34 of the housing 31, and are electrically connected thereto.

Both left and right side surfaces, as viewed in FIG. 9, of the housing 31 are respectively provided with a pair of upper and lower tentatively retaining projections 35 (as viewed in FIG. 9) having tapered surfaces, a pair of upper and lower retaining steps 36 (as viewed in FIG. 9) formed in a tapered manner, a protecting rib 37, and a finally retaining projection 38.

As each tentatively retaining projection 35 on the upper side in FIG. 9 is fitted in a retaining hole 32*a* provided in the rear holder 32 on the upper side in FIG. 9 (hereafter, referred to as the upper rear holder 32), the upper tentatively retaining projection 35 tentatively retains the upper rear holder 32 onto the housing 31. Meanwhile, as each tentatively retaining projection 35 on the lower side in FIG. 9 is fitted in a retaining hole 33*a* provided in the rear holder 33 on the lower side in FIG. 9 (hereafter, referred to as the lower rear holder 33), the lower tentatively retaining projection 35 tentatively retains the lower rear holder 33 onto the housing 31.

When the rear holders 32 and 33 are tentatively retained onto the housing 31 inside the molding and tentatively retaining mold 10, each retaining step 36 on the upper side in FIG. 9 is engaged with a retaining pawl 32*b* provided on the upper rear holder 32. Meanwhile, when the rear holders 32 and 33 are tentatively retained onto the housing 31 inside the molding and tentatively retaining mold 10, each retaining step 36 on the lower side in FIG. 9 is engaged with a retaining pawl 33*b* provided on the lower rear holder 33.

The interval A between the protecting ribs 37 on both left and right sides surfaces, as viewed in FIG. 9, of the housing 31 is set to be larger than the transverse width B of each of the rear holders 32 and 33. Consequently, the rear holders 32 and 33 are prevented from coming off the housing 31 when the connector 30 with rear holders in the tentatively retained state is released from the mold.

Further, when the connecting terminals inserted in the connector 30 with rear holders set in the tentatively retained state and released from the mold are primarily retained by housing lances (not shown) in the terminal accommodating chambers 34 in the housing 31, the finally retaining projections 38 are respectively fitted in the retaining holes 32*a* and 33*a* of the rear holders 32 and 33, so as to finally retain the rear holders 32 and 33 onto the housing 31. In this state, as secondarily retaining projections 32*c* and 33*c* provided on the respective rear holders 32 and 33 are respectively advanced into the terminal accommodating chambers 34 of the housing 31, the connecting terminals are secondarily retained.

A description will be given of the operation in accordance with this embodiment.

In the molding and tentatively retaining mold 10, the resin material is charged into the cavities 17 and 18 for molding the housing 31 and the rear holders 32 and 33 of the connector 30 with rear holders through the runners 20 and 21 corresponding to the cavities 17 and 18 in the state in which the fixed mold 11 and the movable molds 12, 13, 14, and 15 are joined together.

Namely, the resin material is charged into the cavity 17 for the housing 31 from the runner 20 through a tunnel gate 20*a*, while the resin material is charged into the respective cavities 18 for the rear holders 32 and 33 from the runners 21 through tunnel gates 21*a*. Consequently, the housing 31 and the rear holders 32 and 33 are independently molded inside the cavities 17 and 18, respectively.

As the movable molds 12, 13, 14, and 15 are relatively moved with respect to the fixed mold 11 after the molding of the housing 31 and the rear holders 32 and 33, the connections between the runners 21 for the cavities 18 in the rear holders 32 and 33 and the rear holders 32 and 33 through the tunnel gates 21*a* are respectively cut off.

In this state, as the third movable molds 14 relatively move the rear holders 32 and 33 with respect to the housing 31, the connector 30 with rear holders is set in a tentatively retained state.

At this juncture, the runner 20 for the cavity 17 in the housing 31 remains connected to the housing 31 through the tunnel gate 20*a*. Further, the portion 1Sa of the fourth movable mold 15 for forming the cavity in the housing 31 is held as fitted to the housing 31 (in the state shown in FIGS. 5 and 6). Consequently, the shaking and the like of the housing 31 during tentative retention can be prevented.

Referring now to FIGS. 4 to 8, a description will be given of a method of molding and tentatively retaining a connector 30 with rear holders by using the molding and tentatively retaining mold 10 in accordance with this embodiment.

Referring to FIG. 4, in the state in which the fixed mold 11 and the movable molds 12, 13, 14, and 15 are joined together, the resin material is first charged into the cavities 17 and 18 formed in the mold through the runners 20 and 21 corresponding to the cavities 17 and 18. As a result, the housing 31 and the rear holders 32 and 33 are respectively molded independently in the cavities 17 and 18.

At this juncture, since the diameters of the runners 20 and 21 are set in correspondence with the volumes of the moldings for the respective cavities 17 and 18, the charging of the resin material into the respective cavities 17 and 18 is completed substantially at the same time.

Next, referring to FIG. 5, the movable molds 12, 13, 14, and 15 are respectively moved from the fixed mold 11 by predetermined amounts in the rightward direction in FIG. 5, and the first movable mold 12 is moved by a predetermined amount in the rightward direction in FIG. 5 with respect to the second movable molds 13 by the urging forces of the compression springs 16.

At this juncture, the fourth movable mold 15 is relatively moved by a predetermined amount with respect to the second movable molds 13 in interlocking relation to the first movable mold 12 up to a position for forming cavities in a right end portion, as viewed in FIG. 5, of the molded housing 31 by a left end portion, as viewed in FIG. 5, of the fourth movable mold 15. Further, predetermined gap are formed on the inner sides of the third movable molds 14 by the movement of the first movable mold 12.

Further, referring to FIGS. 6 to 8, the third movable molds 14 are respectively moved by the rear-holder tentatively retaining cylinders 19 in the directions of arrows in FIGS. 6 and 8, so as to press the molded rear holders 32 and 33, respectively, toward the housing 31 and tentatively retain them onto the housing 31.

Namely, as the rear holders 32 and 33 are respectively pressed by the third movable molds 14 in the directions of arrows in FIGS. 6 and 8, the tentatively retaining projections 35 of the housing 31 are fitted in the retaining holes 32*a* and 33*a*, and the retaining pows 32*b* and 33*b* are fitted to the retaining means 36. Consequently, the rear holders 32 and 33 are respectively tentatively retained onto the housing 31.

At this juncture, the runner 20 for the cavity 17 in the housing 31 is kept in the state of being connected to the housing 31 through the tunnel gate 20*a*. Further, the portion 15*a* of the fourth movable mold 15 for forming the cavity in the housing 31 is held as fitted to the housing 31 (in the state shown in FIGS. 5 and 6). Consequently, the shaking and the like of the housing 31 during tentative retention is prevented.

As described above, in accordance with the above-described embodiment, when the rear holders 32 and 33 after molding are relatively moved with respect to the housing 31 by the movable molds 12, 13, 14, and 15 and are tentatively retained, the runner 20 for the cavity 17 for molding the housing 31 remains connected to the housing 31 through the tunnel gate 20*a*, and the portion 15*a* of the fourth movable mold 15 for forming the cavity 17 in the housing 31 remains fitted to the housing 31 as it was during molding.

Accordingly, while it is possible to attain the simplification of the mold structure without especially requiring a means for holding the housing 31 after molding, it is possible to reliably prevent the shaking and the like of the housing 31 during tentative retention of the rear holders 32 and 33 onto the housing 31. Consequently, the tentative retention of the rear holders 32 and 33 onto the housing 31 can be effected reliably.

As described above, in accordance with the invention, when at least one part after molding is relatively moved with respect to another part by movable molds and is tentatively retained, the runner for the cavity for molding the other part remains connected to the other part through a tunnel gate. The connection between the other part and the tunnel gate is cut off when the parts are removed from the mold after the tentative retention of the parts.

Accordingly, it is possible to reliably prevent the shaking and the like of the other part during tentative retention without especially requiring a means for holding the other part after molding. Consequently, the tentative retention of the respective parts can be effected reliably.

In addition, in accordance with the invention, when at least one part after molding is relatively moved with respect to the other part and is tentatively retained by movable molds, at least one movable mold for forming the cavity for forming the other part remains fitted to the other part as it was during molding.

Accordingly, it is possible to reliably prevent the shaking and the like of the other part during tentative retention without especially requiring a means for holding the other part after molding. Consequently, the tentative retention of the respective parts can be effected reliably.

What is claimed is:

1. A method of molding and tentatively retaining a connector, comprising the steps of:

forming a plurality of cavities between a fixed mold and a plurality of movable molds that are relatively movable with respect to said fixed mold;

charging a molding material into said cavities through runners respectively provided for said cavities;

molding a rear holder and a housing of different shapes in said cavities;

moving relatively at least one of said movable molds with respect to another movable mold to thereby tentatively retain at least said rear holder to said housing, while keeping at least one of said runners for a cavity for molding said housing connected to said housing through a tunnel gate, and removing said rear holder and said housing from said molding and tentatively retaining mold to thereby cut off the connection between said housing and said tunnel gate.

2. The method of molding and tentatively retaining according to claim 1, wherein during moving relatively at least one of said movable molds with respect to another movable mold to thereby tentatively retain at least said rear holder to said housing, at least one of said movable molds for molding said housing remains fitted to said housing.

3. A molding and tentatively retaining mold for a connector, comprising:

a fixed mold;

a plurality of movable molds that are relatively movable with respect to said fixed mold and adapted to respectively mold a rear holder and a housing of different shapes in a plurality of cavities formed in cooperation with said fixed mold, and to relatively move at least said rear holder with respect to said housing after molding to thereby set said rear holder and said housing in a tentatively retained state; and a plurality of runners respectively provided for the cavities to charge a molding material into the cavities;

wherein, when said rear holder after molding is relatively moved with respect to said housing by said movable molds and is tentatively retained, a runner for a cavity for molding said housing remains connected to said housing through a tunnel gate, and the connection between said housing and said tunnel gate is cut off when said rear holder and said housing are removed from said molding and tentatively retaining mold after the tentative retention of said rear holder and said housing.

4. The molding and tentatively retaining mold according to claim 3, wherein, when said rear holder after molding is relatively moved with respect to said housing by said movable molds and is tentatively retained, at least one of said movable molds for molding said housing remains fitted to said housing.

* * * * *